United States Patent
Hwang

(10) Patent No.: US 9,129,109 B2
(45) Date of Patent: Sep. 8, 2015

(54) METHOD AND APPARATUS FOR DETECTING A MALWARE IN FILES

(75) Inventor: Kyu Beom Hwang, Gyeonggi-do (KR)

(73) Assignee: ANHLAB, INC., Gyeonggi-Do (KR)

( * ) Notice: Subject to any disclaimer, the term of this patent is extended or adjusted under 35 U.S.C. 154(b) by 141 days.

(21) Appl. No.: 13/977,275

(22) PCT Filed: Dec. 19, 2011

(86) PCT No.: PCT/KR2011/009810
§ 371 (c)(1),
(2), (4) Date: Jun. 28, 2013

(87) PCT Pub. No.: WO2012/091341
PCT Pub. Date: Jul. 5, 2012

(65) Prior Publication Data
US 2013/0276117 A1    Oct. 17, 2013

(30) Foreign Application Priority Data
Dec. 31, 2010  (KR) ................. 10-2010-0140173

(51) Int. Cl.
*G06F 21/56* (2013.01)

(52) U.S. Cl.
CPC .............. *G06F 21/56* (2013.01); *G06F 21/564* (2013.01); *G06F 2221/2151* (2013.01)

(58) Field of Classification Search
CPC  G06F 21/564; G06F 21/56; G06F 2221/2151
USPC .......................................................... 726/23
See application file for complete search history.

(56) References Cited

U.S. PATENT DOCUMENTS

| 7,069,594 B1 | 6/2006 | Bolin |
| 7,540,027 B2 | 5/2009 | Achanta et al. |
| 8,401,982 B1* | 3/2013 | Satish et al. .................... 706/20 |
| 2006/0021032 A1 | 1/2006 | Challener et al. |
| 2006/0294589 A1* | 12/2006 | Achanta et al. ................. 726/24 |

FOREIGN PATENT DOCUMENTS

| KR | 1020070029540 A | 3/2007 |
| KR | 1020070030931   | 3/2007 |
| KR | 1020090055669 A | 6/2009 |
| KR | 1020090129609 A | 12/2009 |
| KR | 1020100073126 A | 7/2010 |
| KR | 1020100125116 A | 11/2010 |

* cited by examiner

*Primary Examiner* — Kambiz Zand
*Assistant Examiner* — Benjamin Kaplan
(74) *Attorney, Agent, or Firm* — Bacon & Thomas, PLLC

(57) ABSTRACT

An apparatus for detecting a malware in files includes an acquisition unit configured to obtain from a file system information about a first time point when an interested folder is created by the file system, and information about a second time point when an interested file is created in the interested folder by the file system, a candidate determination unit configured to determine whether the interested file is a candidate file to be subjected to a malware inspection, based on the information on the first and the second time point, and an inspection unit configured to perform the malware inspection on the interested file determined to be the candidate file for the malware inspection.

23 Claims, 3 Drawing Sheets

METHOD AND APPARATUS FOR DETECTING A MALWARE IN FILES

TECHNICAL FIELD

The present invention relates to an apparatus and method for detecting a malware, and more particularly, to an apparatus and method for determining a file to be subjected to a malware inspection based on the feature of the application history of the file.

BACKGROUND ART

A malware is a software designed to perform a malicious action against user's intention in a computer system. The malwares may include a computer virus, a worm, Trojan horse, spyware, a rootkit, and others. Recently, these malwares are exponentially increasing in numbers, and thus, it is getting ever more imperative to efficiently diagnose the malwares and prevent/repair damages therefrom.

In order to search for a file infected with a malware in a computer system and, if necessary, isolate or remove the infected file, an anti-virus program is generally installed in the computer system. If the anti-virus program is installed in the computer system, a malware inspection is usually performed for every file stored in a storage of the computer system. Also, if a portable storage such as a portable hard drive or a USB (Universal Serial Bus) drive is additionally connected to the computer system, the malware inspection is also performed for every file within the portable storage. However, a full inspection performed for every file in a mass storage may take a long time to complete.

Alternatively, the malware inspection may be selectively performed only on files with high possibility to be infected within particular system folders in which an operating system and application programs are installed. Such a selective inspection for the particular folders may be achieved in a shorter time period than that of the full inspection.

However, there may be some files infected with the malwares, but remain undetected if the malware inspection is made on the particular folders only. Moreover, even though the malware inspection is selectively performed only on the particular folders, current operating environment of the computer system renders that most of files within the particular folders may be candidate files to be subjected to the malware inspection to thereby make the reduction in the malware inspection time insignificant.

DISCLOSURE OF INVENTION

Technical Problem

In view of the above, the present invention provides an apparatus and method for determining a file to be subjected to a malware inspection depending on information on the folder and file history provided from a file system.

Solution to Problem

In accordance with a first aspect of the present invention, there is provided an apparatus for detecting a malware in files, which comprises:

an acquisition unit configured to obtain from a file system information about a first time point when an interested folder is created by the file system, and information about a second time point when an interested file is created in the interested folder by the file system;

a candidate determination unit configured to determine whether the interested file is a candidate file to be subjected to a malware inspection, based on the information on the first and the second time point; and an inspection unit configured to perform the malware inspection on the interested file determined to be the candidate file for the malware inspection.

Preferably, the candidate determination unit is configured to determine the interested file as the candidate file to be inspected in case that the second time point is behind a predetermined term from the first time point.

Preferably, the interested folder is associated with an operating system employing the file system.

Preferably, the interested folder has a folder name that is prohibited from being renamed by the operating system.

Preferably, the interested folder has a parent folder, and wherein the first time point is within a predetermined term from the time when the parent folder was created.

Preferably, the interested folder contains a plurality of files inclusive of the interested file, and the number of files created within a predetermined term from the first time point is larger than a threshold number.

Preferably, the predetermined term from the first time point is defined on the basis of a size of the folder.

Preferably, the interested folder contains a plurality of files inclusive of the interested file, and wherein the predetermined term from the first time point is defined based on a plurality of time points corresponding to creation of the plurality of files.

Preferably, the candidate determination unit is further configured to determine the interested file as the candidate file to be inspected in case that the first time point is behind the predetermined term.

Preferably, the acquisition unit is further configured to obtain from the file system information on a third time point, when the interested file is changed by the file system, and wherein the candidate determination unit is further configured to determine the interested file as the candidate file in case that the third time point is behind a predetermined term from the second time point, Preferably, the candidate determination unit is further configured to determine the interested file as the candidate file in case that the second time point is behind a second predetermined time point.

Preferably, the inspection unit is further configured to receive a request to perform the malware inspection on the interested file when the interested file is determined as an candidate file, and not to perform the malware inspection on the interested file when it is determined that the interested file is not a candidate file.

Preferably, the inspection unit performs the malware inspection when it is requested to perform the malware inspection, and does not perform the malware inspection when it is requested not to perform the malware inspection.

In accordance with a second aspect of the present invention, there is provided a method for detecting a malware in files, which includes:

obtaining from a file system information about a first time point when an interested folder is created by the file system and information about a second time point when an interested file is created in the interested folder by the file system;

determining whether or not the interested file is a candidate file to be subjected to a malware inspection based on the information about the first and the second time point; and performing the malware inspection on the interested file determined to be the candidate file.

Preferably, said determining whether or not the interested file is a candidate file includes determining the interested file as a candidate file to be subjected to the malware inspection in case that the second time point is behind a predetermined term from the first time point.

Preferably, the interested folder is associated with an operating system employing the file system.

Preferably, the interested folder has a folder name that is prohibited from being renamed by the operating system.

Preferably, the interested folder has a parent folder, and wherein the first time point is within a predetermined term from the time when the parent folder was created.

Preferably, the interested folder contains a plurality of files inclusive of the interested file, and the number of files created within a predetermined term from the first time point is larger than a threshold number.

Preferably, the predetermined term from the first time point is defined on the basis of a size of the folder.

Preferably, the interested folder contains a plurality of files inclusive of the interested file, and wherein the predetermined term from the first time point is defined based on a plurality of time points corresponding to creation of the plurality of files.

Preferably, said determining whether or not the interested file is a candidate file further includes determining the interested file as the candidate file in case that the first time point is behind the predetermined term.

Preferably, the method further includes:
obtaining from the file system information about a third time point when the interested file is changed; and
determining the interested file as the candidate file in case that the third time point is behind a predetermined term from the second time point.

Preferably, said determining whether or not the interested file is a candidate file further includes determining the interested file as the candidate file in case that the second time point is behind a second predetermined time.

In accordance with a third aspect of the present invention, there is provided a computer-readable storage medium which stores a computer program of a method for determining files to be subjected to a malware inspection in accordance with the method as set forth above.

BRIEF DESCRIPTION OF DRAWINGS

The above and other objects and features of the present invention will become apparent to those skilled in the art from the following description of embodiments, given in conjunction with the accompanying drawings, in which.

BEST MODE FOR CARRYING OUT THE INVENTION

Figure 1:
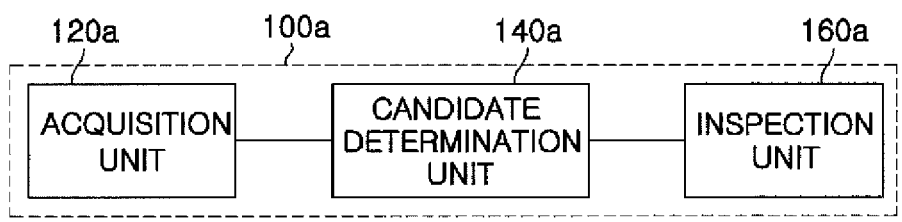
FIG. 1 is a block diagram showing an apparatus for determining files to be subjected to a malware inspection in accordance with an embodiment of the present invention.

Hereinafter, embodiments of the present invention will be described in detail with reference to the accompanying drawings so that they can be readily implemented by those skilled in the art. The accompanying drawings in which like reference numerals refer to identical or functionally similar elements throughout the separate views and which together with the detailed description below are incorporated in and form part of the specification.

FIG. 1 is a block diagram showing an apparatus for determining a file to be subjected to a malware inspection in accordance with an embodiment of the present invention.

Referring to FIG. 1, an apparatus 100a for determining a file to be subjected to a malware inspection includes an acquisition unit 120a for obtaining information on files and folders from a file system being executed in a computer system, a candidate determination unit 140a for determining which files are candidate files to be inspected depending on the information on files and folders, and an inspection unit 160a for performing a malware inspection for the files determined to be inspected. The file system is means to organize data or data files considered to be retained after a program is terminated by providing procedures to store, retrieve and update the data or data files, as well as manage the available space on a storage device which contains it. Most operating systems, for example, such as DOS, WINDOWS and the like, provide a file system to generate files, establish attributes of files, read files, update files, and do other works.

The acquisition unit 120a obtains from a file system information about a time point when an interested folder was created by the file system; and information about a time point when an interested file was created in a folder by the file system. Further, the acquisition unit 120a obtains information about any change in the interested file or folder from the file system. More particularly, the acquisition unit 120a obtains the information about a time point when the interested file or folder was changed from the file system.

The candidate determination unit 140a determines whether or not the interested file is a candidate file to be inspected depending on the information such as the folder or file creation time. In this embodiment, in order to determine the candidacy of the file for inspection, the candidate determination unit 140a checks whether the interested file has been created after a predetermined term from the creation time point of the interested folder containing the interested file. Further, the candidate determination unit 140a checks whether the interested file has been changed since it has been created.

Optionally, the candidate determination unit 140a may determine that an interested file which has not been used for a predetermined time period is not a candidate file.

The inspection unit 160a serves to perform the malware inspection on the interested file determined as the candidate file for the inspection to detect a malware concealed therein. Optionally, the inspection unit 160a may selectively perform the malware inspection on the interested file determined as a candidate file in accordance with a request to perform the malware inspection on the interested file when the interested file is determined as an candidate file, and not to perform the malware inspection on the interested file when it is determined that the interested file is not a candidate file.

Figure 2:
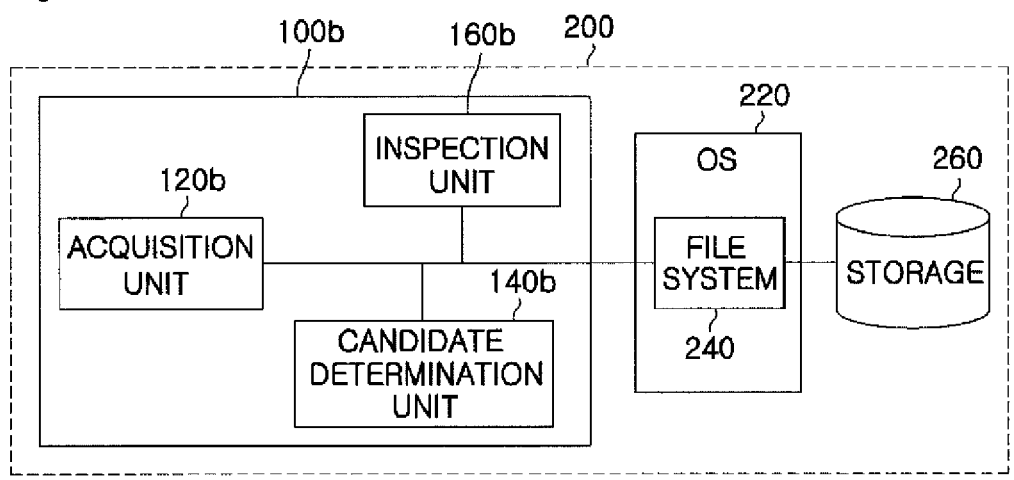
FIG. 2 is a block diagram showing a computer system having the apparatus shown in FIG. 1 in accordance with an embodiment of the present invention.

FIG. 2 is a block diagram showing a computer system which performs a malware inspection by employing the apparatus for determining a file to be subjected to a malware inspection shown in FIG. 1.

Referring to FIG. 2, the computer system 200 includes a malware detection apparatus 100b, an operating system 220 with a file system 240, and a storage 260.

As well known in the art, the operating system 220 is a set of programs loaded in a memory in the computer system 200 to manage hardware resources of the computer system 200. Examples of popular operating system 220 may include any one of, but is not limited to, Microsoft Windows, UNIX, Linux, or other arbitrary operating system series. Such an operating system 220 provides a file system 240 by which files and folders are organized within the storage 260. The file system 240 provides a variety of file and folder information such as the information about the creation and change of the files and folders. For example, in case where the Microsoft Windows implements the operating system 220, the file system 240 may be, NTFS (New Technology File System) which is a default file system for the Microsoft Windows. For a file, the NTFS provides an attribute representative of location, size, or created or changed time of the file, for example, such as $STANDARD_INFORMATION or $FILE_NAME within MFT (Master File Table) entry which is assigned to the file. The storage 260 may include, but is not limited to, a hard disk, a volatile memory device such as RAM, an optical disk, and other arbitrary storage devices.

The apparatus 100b shown in FIG. 2 includes an acquisition unit 120b, a candidate determination unit 140b, and an inspection unit 160b, all of which may be implemented in such a manner that a program stored in a memory of the computer system 200 is executed by a processor of the computer system 200 under an environment which is provided by the operating system 220.

The acquisition unit 120b obtains from the file system 240 information about a first time point when an interested folder was created (hereinafter referred to as a first time point) by the file system 240 and information about a second time point when an interested file contained in the interested folder was created (hereinafter referred to as a second time point) by the file system 240. Further, the acquisition unit 120b obtains from the file system 240 information about a third time point when the interested file or folder is changed (hereinafter referred to as a third time point) by the file system.

The candidate determination unit 140b determines whether or not the interested file becomes a candidate file to be subjected to a malware inspection, based on the information about the first, second and third time points. The inspection unit 160b performs the malware inspection on the interested file when the interested file is determined to be the candidate file for the inspection.

In accordance with an embodiment of the present invention, first of all, the candidate determination unit 120b determines the interested file as a candidate file for the inspection if the second time point falls at a time point behind a first predetermined term from the first time point. The ground that the first time point is referenced to determine the interested file to be the candidate file will be discussed hereinafter.

As set forth above, the interested folder may be a folder associated with the operating system 220 which employs the file system 240. That is, the interested folder may be a folder in the storage 260 in which the operating system is installed by using the file system 240. In case where the operating system 220 is installed in the computer system 200, some of folders associated with the operating system 220 are prohibited from being renamed by the operating system 220. For example, if the operating system 220 is implemented with Microsoft Windows, the folders prohibited from being renamed may be folders such as "Windows", "Drivers", and "System32". Therefore, it can be recognized that a first time point when the folders prohibited from being renamed are created is substantially identical to an installed time of the operating system. Accordingly, the first time point can be considered as a reference time point to determine whether files within an interested folder are created right after or within a predetermined term from the creation of the interested folder. This conforms to the characteristic features that the creation time of an interested file infected with a malware is in general not immediate after the creation time of the interested folder.

Based on the above fact, the candidate determination unit 140b determines the interested file as the candidate file if the second time point is behind the first predetermined term, enough to complete the installation of the operating system 220, from the first time point.

However, if the second time point is within the first predetermined term from the first time point, the candidate determination unit 140b determines that the interested file is not the candidate file. In this case, the candidate determination unit 140b permits the inspection unit 160b not to perform the malware inspection on the interested file.

Secondly, in accordance with the present invention, the interested folder has a parent folder and the first time point may be considerably close to a time point when the parent folder was created; to put it another way, the first time point may be within a second predetermined term from the creation time of the parent folder. Under this condition, it can be recognized that an interested file contained in the interested folder were created right after the creation of the interested folder. Accordingly, the first time point satisfying the above condition can be considered as the reference time point.

Thirdly, in accordance with the present invention, the interested folder may contain a plurality of files inclusive of the interested file and the number of files having their second time points that are close to the first time point may be larger than a threshold number; in other words, the number of files created within a third predetermined term from the first time point may be larger than a threshold number. Under the conditions, it can be recognized that most files in the interested folder were created right after the creation of the interested folder. Therefore, the first time point satisfying the above conditions can be defined as the reference time point.

For example, assuming that the operating system 220 is implemented with Microsoft Windows and thus the file system 240 is implemented with NTFS, in order to determine whether the creation time of the interested file is close to the creation time of the interested folder, the candidate determination unit 140b obtains LSNs ($LogFile Sequence Number) information of the interested folder and the interested file contained in the interested folder on a MFT entry header and compares the obtained LSN information of the interested folder and file.

Fourthly, in the above case, if the second time point is behind a fourth predetermined term from the first time point, wherein the fourth predetermined term may be varied depending on a size of the interested folder, the candidate determination unit 140b determines the interested file as a candidate file for the inspection and requests the inspection unit 160b to perform the malware inspection onr the interested file.

For example, assuming that the operating system 220 is implemented with Microsoft Windows and the file system 240 is implemented with NTFS, the comparison between the first and the second time point can be performed by using the LSN information on the interested folder and the LSN information on the interested file, as set forth above. Also, the fourth predetermined term may be derived from an average value of the LSNs of the interested files within the interested folder.

Fifthly, in the above case, only if the first time point, i.e., the creation time of the interested folder, is ahead a fifth predetermined term (for example, before 2 or 3 months from the current time point), the candidate determination unit 140b determines whether or not the interested files contained in the interested folder need to be subjected to the malware inspection. If the first time point is behind the fifth predetermined term, the candidate determination unit 140*b* determines the interested file contained in the interested folder as the candidate file for the inspection.

Furthermore, sixthly, in accordance with an embodiment of the present invention, the acquisition unit 120*b* obtains from the file system 240 information about a third time point when the interested file was changed. If there is a difference between the second and the third time point (for example, if the third time point is behind a sixth predetermined term from the second time point), the candidate determination unit 140*b* determines the interested file as a candidate file for inspection. That is, the correspondence between the created and the changed time point of the interested file indicates that there is no change in the interested file and that the inconsistencies between the created and the changed time point of the interested file indicate that the interested file needs to be subjected to the malware inspection.

For example, assuming that the file system 240 is implemented with NTFS, the acquisition unit 120*b* obtains information about Creation Time, Access Time and Modification Time of $Filename and MFT Entry Modified, to determine whether the interested file has been changed.

In the above case, the candidate determination unit 140*b* determines the interested file as a candidate file to be subjected to the malware inspection only if the second time point is behind a seventh predetermined time point (for example, before 2 or 3 months from the current time point).

Figure 3:
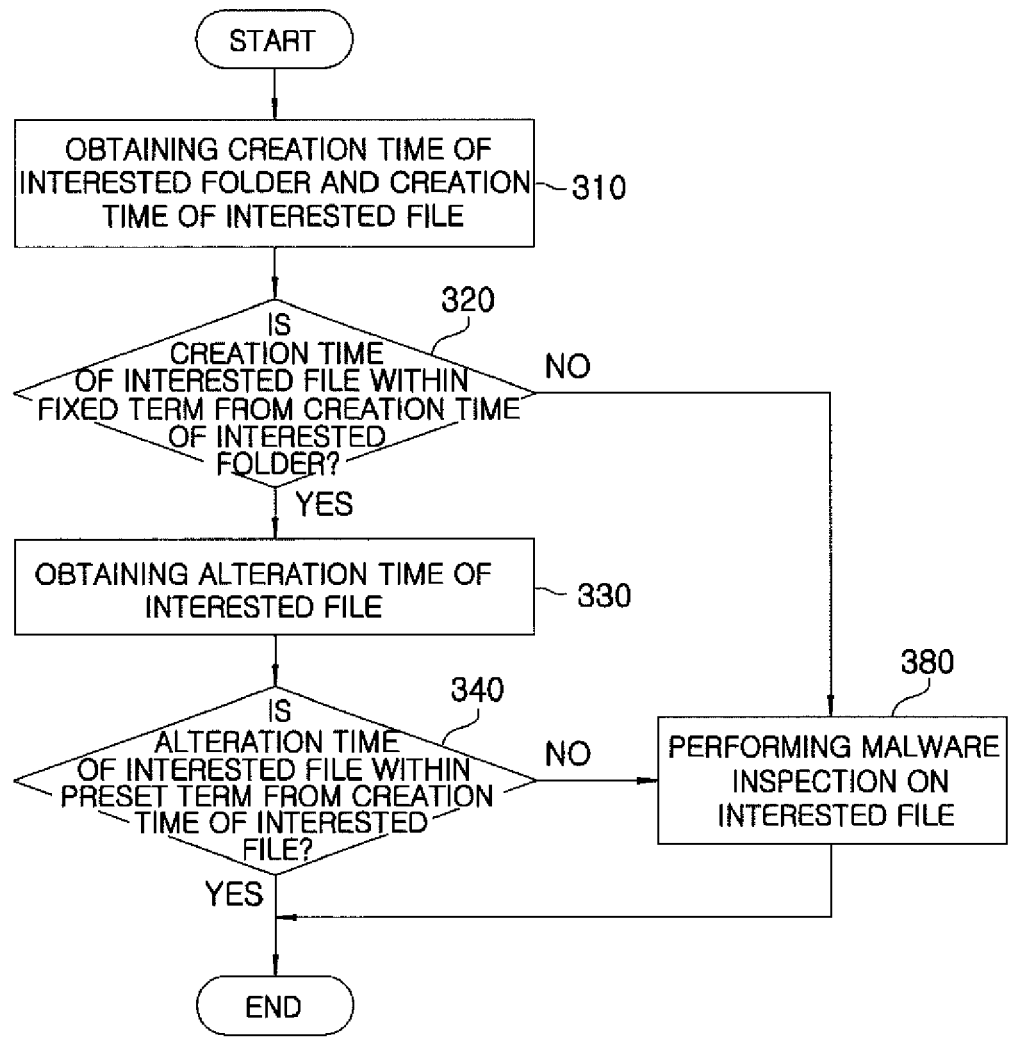
FIG. 3 is a flow chart illustrating a method for determining a file to be subjected to a malware inspection in accordance with an embodiment of the present invention.

FIG. 3 is a flow chart illustrating a process for determining a file to be subjected to a malware inspection in accordance with a first embodiment of the present invention.

At the start of the process in accordance with the first embodiment of the present invention, in step 310, information about the first time point when an interested folder is created and information about the second time point when an interested file contained in the interested folder is created are obtained first from the file system 240.

Subsequently, in step 320, based on the information about the first and the second time point, it is determined whether or not the interested file becomes a candidate file to be subjected to a malware inspection. That is, if the second time point is behind a predetermined term from the first time point, it is determined that the interested file is the candidate file to be inspected. On the contrary, it is determined that the interested file is not a candidate file for the inspection if the second time point is within the first predetermined term from the first time point.

However, if it is determined that the interested file is a candidate file for the inspection, the process goes step 380 where the malware inspection is performed for determining whether a malware is included in the interested file.

If it is determined that the interested file is not a candidate file to be inspected, the process goes to step 330 where information on a third time point when the interested file is changed is obtained from the file system. Alternatively, information on the third time point may be simultaneously obtained together with information on the first time point and the second time point from the file system.

Next, in step 340, it is determined whether or not the interested file becomes a candidate file to be inspected by comparison between the third time point and the second time point. More specifically, if the third time point is behind a predetermined term from the second time point, it is determined that the interested file is a candidate file to be inspected. On the contrary, it is determined that the interested file is not a candidate file for the malware inspection if the third time point is within the predetermined term from the second time point.

If it is determined in the step 340 that the interested file is a candidate file to be inspected, the process advances to step 380 as described above where the malware inspection is performed for determining whether the interested file includes a malware.

On the contrary, if it is determined in the step 340 that the interested file is not a candidate file to be inspected, the interested file is exempted from the malware inspection.

After these steps, the malware detection process is ended. Subsequently, the process may be repeatedly performed for another file.

Figure 4:
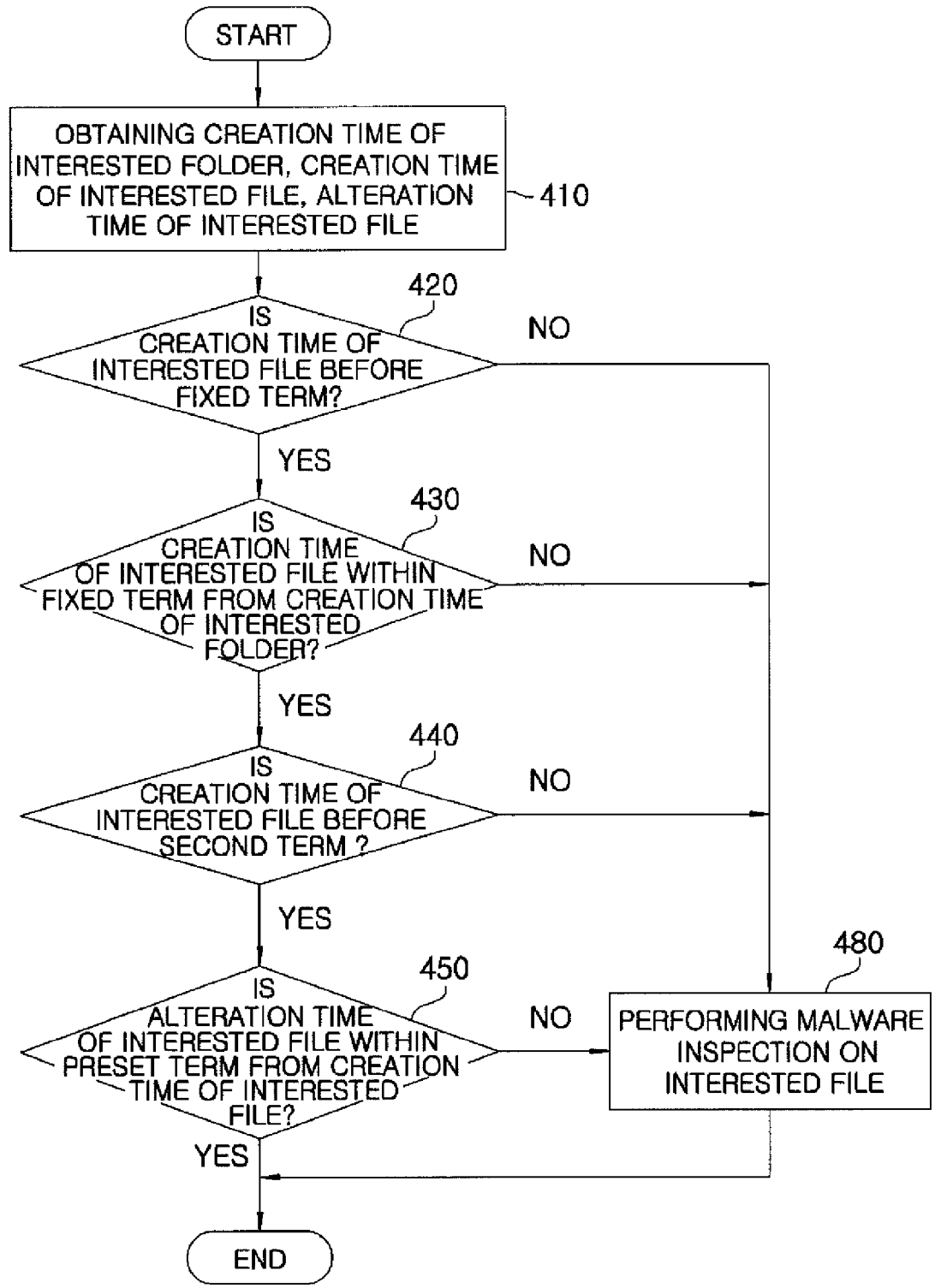
FIG. 4 is a flow chart illustrating a method for determining a file to be subjected to a malware inspection in accordance with another embodiment of the present invention.

FIG. 4 is a flow chart illustrating a process of determining files to be subjected to a malware inspection in accordance with another embodiment of the present invention.

At the start of the process in accordance with another embodiment of the present invention, as in step 410, information about the first time point when an interested folder is created, information about the second time point when an interested file within the interested folder is created, and information about a third time point when the interested file is changed are obtained from the file system 240. Alternatively, the first time point information and the second time point information may be obtained first from the file system and then compared with each other to determine whether the interested file is a candidate file to be inspected, before the third time point information is obtained.

Subsequently, in step 420, it is determined whether the first time point is ahead a first predetermined term from a current time.

If the first time point is behind the first predetermined term from the current time, the interested file is determined to be a candidate file for the inspection, and the process proceeds to step 480, In step 480, the malware inspection is performed on the interested file.

However, if the first time point is ahead of the first predetermined term from the current time, the process advances step 430. In step 430, it is determined whether or not the second time point is within a predetermined term from the first time point.

As a result of the determination, if the second time point is behind the predetermined term from the first time point, the interested file is determined to be a candidate file for the inspection; and therefore, the malware inspection is performed on the interested file as in step 480.

However, if the second time point is within the first predetermined term from the first time point, the process goes to step 440. In step 440, it is determined whether or not the second time point is ahead of a second predetermined term from the current time.

Subsequently, the interested file is determined to be a candidate file for the inspection in a case that the second time point is ahead the second predetermined terra from the current time, and therefore, the malware inspection for the interested file is performed.

On the other hand, if the second time point is ahead of the second predetermined term from the current time, in step 450, it is determined whether the third time point is within a predetermined term from the second time point.

If the third time point is behind the predetermined term from the second time point, the interested file is determined to be a candidate file for the inspection. Therefore, the malware inspection will be performed on the interested file in step 480.

On the contrary, in a case that the third time point is within the predetermined term from the second time point, the interested file is exempted from the malware inspection.

After the above steps, the process is completed. Subsequently, the process may be repeatedly performed for another file.

As described above, in accordance with embodiments of the present invention, a preemptive action such as determining whether or not an interested file is a candidate file for the malware inspection is performed, and the malware inspection is then performed only for the files determined as candidates for the inspection. Therefore, time being spent in a malware inspection can be reduced, and furthermore resource scarcity and performance deterioration of a computer system can be prevented.

While the invention has been shown and described with respect to the preferred embodiments, it will be understood by those skilled in the art that various changes and modifications may be made without departing from the scope of the invention as defined in the following claims.

The invention claimed is:

1. An apparatus for detecting a malware in files, comprising:
    an acquisition unit configured to obtain from a file system information about a first time point when a folder is created by the file system, and information about a second time point when a file is created in the folder by the file system;
    a candidate determination unit configured to determine whether the file created by the file system is a candidate file to be subjected to a malware inspection, based on the information on the first and the second time point; and
    an inspection unit configured to perform the malware inspection on the file created by the file system when it is determined to be the candidate file for the malware inspection,
    wherein the candidate determination unit is configured to determine that the file created by the file system is the candidate file to be inspected when the second time point is not within a predetermined time interval from the first time point.

2. The apparatus of claim 1, wherein the folder is associated with an operating system employing the file system.

3. The apparatus of claim 2, wherein the folder has a folder name that is prohibited from being renamed by the operating system.

4. The apparatus of claim 1, wherein the folder has a parent folder, and wherein the candidate determination unit is configured to determine that the file created by the file system is the candidate file to be inspected when the first time point is within a predetermined time interval from the time when the parent folder was created.

5. The apparatus of claim 1, wherein the folder contains a plurality of files inclusive of the file created by the file system, and the candidate determination unit is configured to determine that the file created by the file system is the candidate file to be inspected when the number of files created within the predetermined time interval from the first time point is larger than a threshold number.

6. The apparatus of claim 1, wherein the predetermined time interval from the first time point is defined on the basis of a size of the folder.

7. The apparatus of claim 1, wherein the folder contains a plurality of files inclusive of said file created by the file system, and wherein the predetermined time interval from the first time point is defined based on a plurality of time points corresponding to creation of the plurality of files.

8. The apparatus of claim 1, wherein the candidate determination unit is further configured to determine that the file created by the file system is the candidate file to be inspected when the first time point precedes the predetermined time interval.

9. The apparatus of claim 1, wherein the acquisition unit is further configured to obtain from the file system information on a third time point when the file created by the file system is changed by the file system, and wherein the candidate determination unit is further configured to determine that the file created by the file system is the candidate file when the third time point is not within a predetermined time interval from the second time point.

10. The apparatus of claim 1, wherein the candidate determination unit is further configured to determine that the file created by the file system is the candidate file when the second time point precedes a second predetermined time point.

11. The apparatus of claim 1, wherein the inspection unit is further configured to receive a request to perform the malware inspection on the file created by the file system when the file created by the file system is determined to be the candidate file, and not to perform the malware inspection on the file created by the file system when it is determined that the file created by the file system is not the candidate file.

12. The apparatus of claim 11, wherein the inspection unit performs the malware inspection when it is requested to perform the malware inspection, and does not perform the malware inspection when it is requested not to perform the malware inspection.

13. A method for detecting a malware in files, the method comprising:
    obtaining from a file system information about a first time point when folder is created by the file system and information about a second time point when a file is created in the folder by the file system;
    determining whether or not the file created by the file system is a candidate file to be subjected to a malware inspection based on the information about the first and the second time point; and
    performing the malware inspection on the file created by the file system when it is determined to be the candidate file,
    wherein said determining whether or not the file created by the file system is a candidate file includes determining the file created by the file system is a candidate file to be subjected to the malware inspection when the second time point is not within a predetermined time interval from the first time point.

14. The method of claim 13, wherein the folder is associated with an operating system employing the file system.

15. The method of claim 14, wherein the folder has a folder name that is prohibited from being renamed by the operating system.

16. The method of claim 13, wherein the folder has a parent folder, and wherein said determining whether or not the file created by the file system is a candidate file includes determining when the first time point is within a predetermined time interval from the time when the parent folder was created.

17. The method of claim 13, wherein the folder contains a plurality of files inclusive of the file created by the file system, and the number of files created within a predetermined time interval from the first time point is larger than a threshold number.

18. The method of claim 13, wherein said determining whether or not the file created by the file system is a candidate file includes determining when the predetermined time interval from the first time point is defined on the basis of a size of the folder.

19. The method of claim 13, wherein the folder contains a plurality of files inclusive of the file created by the file system, and wherein the predetermined time interval from the first time point is defined based on a plurality of time points corresponding to creation of the plurality of files.

20. The method of claim 13, wherein said determining whether or not the file created by the file system is a candidate file further includes determining that the file created by the file system is the candidate file when the first time point precedes the predetermined time interval.

21. The method of claim 13, further comprising:
   obtaining from the file system information about a third time point when the file created by the file system is changed; and
   determining that the file created by the file system is the candidate file when the third time point is not within a predetermined time interval from the second time point.

22. The method of claim 13, wherein said determining whether or not the file created by the file system is a candidate file further includes determining that the file created by the file system is the candidate file when the second time point precedes a second predetermined time.

23. A non-transitory computer-readable storage medium storing a computer program configured to perform the method of claim 13.

* * * * *